United States Patent [19]

Mischke et al.

[11] Patent Number: 4,702,663
[45] Date of Patent: Oct. 27, 1987

[54] REMOTELY-OPERABLE CARRIER ARRANGEMENT FOR RECEIVING AND POSITIONING REMOTE-HANDLING APPARATUS

[75] Inventors: Joachim Mischke, Hanover; Günter Schröder, Minden-Dützen, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 829,525

[22] Filed: Feb. 14, 1986

[30] Foreign Application Priority Data

Feb. 15, 1985 [DE] Fed. Rep. of Germany ....... 3505193

[51] Int. Cl.$^4$ ............................................. B25J 5/04
[52] U.S. Cl. ..................................... 414/618; 187/10; 187/12; 212/179; 414/680; 414/749; 901/15; 901/16
[58] Field of Search ............... 414/749, 279, 280, 659, 414/10, 618, 619, 620; 187/2, 6, 10, 12, 9 R; 212/179, 265; 901/15, 16

[56] References Cited

U.S. PATENT DOCUMENTS

| | | | |
|---|---|---|---|
| 2,513,403 | 7/1950 | Dakin | 212/179 |
| 3,606,162 | 9/1971 | Lehmann | 901/16 X |
| 3,665,148 | 5/1972 | Yasenchak et al. | 901/16 X |
| 4,242,025 | 12/1980 | Thibault | 901/16 X |

FOREIGN PATENT DOCUMENTS

2120202 11/1983 United Kingdom .

Primary Examiner—Robert J. Spar
Assistant Examiner—Donald W. Underwood
Attorney, Agent, or Firm—Walter Ottesen

[57] ABSTRACT

A remotely-operable positioning and carrier arrangement for mounting and positioning remote handling apparatus is described for use in large-area cells containing process equipment particularly in radioactively-charged large-area cells of facilities for reprocessing irradiated nuclear fuels. In such large-area cells, the process components are disposed in racks. Maintenance and servicing work is carried out on the process components and the racks using the remote handling apparatus. The positioning and carrier arrangement which is used for this purpose has a vertically movable support. For a more precise positioning, the positioning and carrier arrangement is transportable and can be suspended on the particular rack at which work is to be done. The positioning and carrier arrangement has a table-like main frame which, in turn, has legs which are disposed horizontally when the frame is suspended on the rack. The ends of the legs are supported against the rack. The vertically movable support is a main sled which is displaceable parallel to the outside of the main frame. The main sled carries a transversely movable equipment sled facing toward the rack which is adapted to carry remote-handling apparatus.

12 Claims, 8 Drawing Figures

Fig. 8

REMOTELY-OPERABLE CARRIER ARRANGEMENT FOR RECEIVING AND POSITIONING REMOTE-HANDLING APPARATUS

FIELD OF THE INVENTION

The invention is directed to a remotely-operable positioning and carrier arrangement for receiving and positioning remote-handling apparatus for use in large-area cells such as radioactively-charged large-area cells of a facility for reprocessing irradiated nuclear fuels. Process components are mounted in racks in the large-area cells and maintenance work is carried out on these components with the remote-handling apparatus.

BACKGROUND OF THE INVENTION

Installations for reprocessing irradiated nuclear fuels have what are referred to as "large-area hot cells" for accommodating the process equipment. In such radiation-shielded cells, the process components are set up in frames or support structures known as racks.

Routine maintenance and repair operations on the process components within the large-area cell, which is charged with radioactive radiation, are to be carried out without the need for operating personnel to enter the cell. It has therefore been proposed that the operations should be carried out by means of movable remote-handling machines. Accordingly, the racks carrying the process equipment are set up in such a way as to be consistent with remote handling, namely, along the longitudinal walls of the hot cell in two mutually adjacent rows.

This arrangement leaves free a central passageway in which transportable remote-handling machines for routine maintenance, repair and for replacing individual process components or fully equipped racks can be moved. A combination of remote-handling machines has already been proposed, for routine maintenance operations and for the replacement of individual process components or entire racks. In this connection, one proposal provides that a remotely-controlled travelling bridge crane operates under the roof above the racks, the crane passing over the two rows of racks and the central passageway. After all connections and conduits have been released, the bridge crane is used to lift the racks or heavy individual components out of their anchoring, and move them horizontally into the transportation passageway.

In addition to the above-mentioned travelling bridge crane, a manipulator carrier system was provided, with horizontal operation from the middle passageway to the process components for positioning operating and maintenance apparatus and tools. The manipulator carrier system affords the possibility of using electrical servo and power manipulators. Small components are manipulated with the available manipulators and lifting appliances, in dependence on the configurations of the manipulator carrier system.

A proposed manipulator carrier system is configured as a crane-like arrangement wherein a vertical column is arranged on a bridge carrier movable along the large-area cell. The vertical column is movable on a trolley of the bridge carrier. Disposed on the column is a vertically movable chassis frame having a cantilever arm which has a tool carrier plate for mounting or connecting the tools or handling equipment. This proposed manipulator carrier system is arranged to be movable under remote control along the large-area cell beneath the bridge crane and in a separate plane.

An advantageous division of work can be achieved with the arrangement of a travelling bridge crane and a manipulator carrier system. The remotely-controlled bridge crane is used predominantly for carrying and transporting conduit connections, components and individual racks. It performs the operations of lowering and holding tools such as cutting and welding equipment as required. The manipulator carrier system which is movable in the transportation passageway is provided for guiding impact wrenches or other special tools which can be utilized as additional dismantling aids. The manipulator carrier system can also be used for carrying television equipment or other ancillary devices.

In an effort to further improve the known remote-handling procedures, investigations are made into and efforts directed to carrying out handling and operating steps in a more precise and simpler fashion. The hitherto conventional mode of operation is to be simplified and speeded up, for at least some of the transportation, handling and operating steps. In addition, the effort is made to increase the operational possibilities of the remote-handling techniques.

SUMMARY OF THE INVENTION

It is an object of the invention to provide a remotely-operable positioning and carrier arrangement that permits a precise and good positioning of the particular remote-handling apparatus or operating equipment relative to the location of the work and that is suitable for many different kinds of routine maintenance and repair operations which are to be carried out in a remotely-handled manner.

The positioning and carrier arrangement according to the invention is picked up by the load hook of the travelling bridge crane and moved to the rack having the work location where it is hung in position. For it to be transported, the arrangement therefore does not require any independent travelling drives, as well as the measuring and signal transmission means that are required for such drives. The vertically movable sled moves the equipment sled to the operating elevation. The horizontally movable equipment sled provides for lateral positioning of the remote-handling apparatus. It is possible for such apparatus to be brought more closely to the operating positions.

The invention provides a positioning and carrier arrangement which, after it has been placed at the particular rack containing the location at which an operation is to be carried out, is in a lock-tight or form-tight connection with the rack. The positioning and carrier arrangement is fixedly mounted to the rack. Therefore, the operating conditions present are similar to those to be found on a machine tool in which a workpiece is clamped. In this case, the positioning and carrier arrangement represents the machine tool, that is to say, the processing unit. The fact that the positioning and carrier arrangement is applied to the rack containing the location of operation provides a clear and nonchanging reference plane for positioning the remote-handling apparatus and the operations to be carried out.

It will be apparent that the remote-handling apparatus can be taken more closely to the location of operation when using the positioning and carrier arrangement according to the invention. This also permits extremely precise positioning of the remote-handling apparatus.

The precise positioning of the remote-handling apparatus, which derives from the above-indicated considerations, permits a greater range of use of the positioning and carrier arrangement up to and including the use of computer-controlled remote-handling apparatus.

Another major advantage of the invention is that there is no need for the positioning and carrier arrangement to have its own crane travel track beneath the remote-controlled bridge crane. In this way it is possible either to reduce the height of the large-area cell or to transport process components or individual rack portions, which are removed with the bridge crane, over the rows of racks.

The positioning and carrier arrangement according to the invention makes it possible for a plurality of the positioning and handling carrier arrangements according to the invention to be suspended on racks on which maintenance is to be carried out, before the process facility is run down or shut down prior to taking up the maintenance operations. After the installation has been shut down, it is immediately possible to operate at the same time on a plurality of racks. This is also the case even when two racks are mutually adjacent at the same location of the transportation passageway. The facility can also start up again although the positioning and carrier arrangements are still mounted on the racks. The arrangements can be taken off during operation of the facility and put into their area where they are held ready for use.

When a rack module is brought into the service area which is provided in a reprocessing facility, it is possible, by virtue of the invention, for a plurality of maintenance operations to be carried out simultaneously if four positioning and handling arrangements are suspended on the module on all four sides thereof.

The firm connection of the positioning and carrier arrangement to the particular rack module permits the rack to be more densely equipped with process components because it is now possible to carry out finer operations within the rack.

In an advantageous embodiment of the invention, the two upper legs of the base frame are provided at their ends with hooks which can be hung into the rack. With this configuration, it is possible for the positioning and carrier arrangement to be hung on the transverse struts at the front side of the rack. The transverse strut selected for that purpose will be the one which places the positioning and carrier arrangement most closely adjacent to the location of work.

In another advantageous embodiment, the two lower legs of the base frame are provided at their ends with mechanically operable clamps. The clamps surround the front vertical supports or posts and secure the positioning and carrier arrangement to the rack.

Advantageously, the two hooks have clamps which are displaceable in the direction of the particular leg axis and which engage behind the carrying transverse beam of the rack. By way of the mechanically operable clamps, the base frame of the positioning and carrier arrangement is drawn against the front side of the vertical supports. In addition, the displaceable clamps permit the positioning and carrier arrangement to be adapted to different sizes of section of the transverse beams.

In another embodiment of the invention, the positioning and carrier arrangement has suitable coupling means for making a connection to electrical and/or information-carrying supply lines. Supply plug sockets are usually arranged on the wall of the cell. The coupling portions, which are mounted on cables or hoses of the positioning and carrier arrangement, are gripped with the usual lifting appliances on the travelling bridge crane and fitted into the supply plug sockets.

Therefore, there is no need for supply conduits which trail along behind and the usual loop formation associated therewith as is usual with conventional manipulator carrier systems which are movable in the transportation passageway. The transmission of energy is extremely secure and safe.

The invention provides a separate workplace on the rack module for the purpose of carrying out the necessary routine maintenance and repair work. This separate workplace is formed by the positioning and carrier arrangement which is brought to the rack and the location at which work is to be performed. After the arrangement has been suspended onto the particular rack, an independent working island is established.

BRIEF DESCRIPTION OF THE DRAWING

Two embodiments of the invention will be described in greater detail with reference to the drawing. Devices which do not contribute to an understanding of the invention have been omitted from the drawing to improve the clarity of presentation. In the drawing.

DESCRIPTION OF THE PREFERRED EMBODIMENTS OF THE INVENTION

Figure 1:
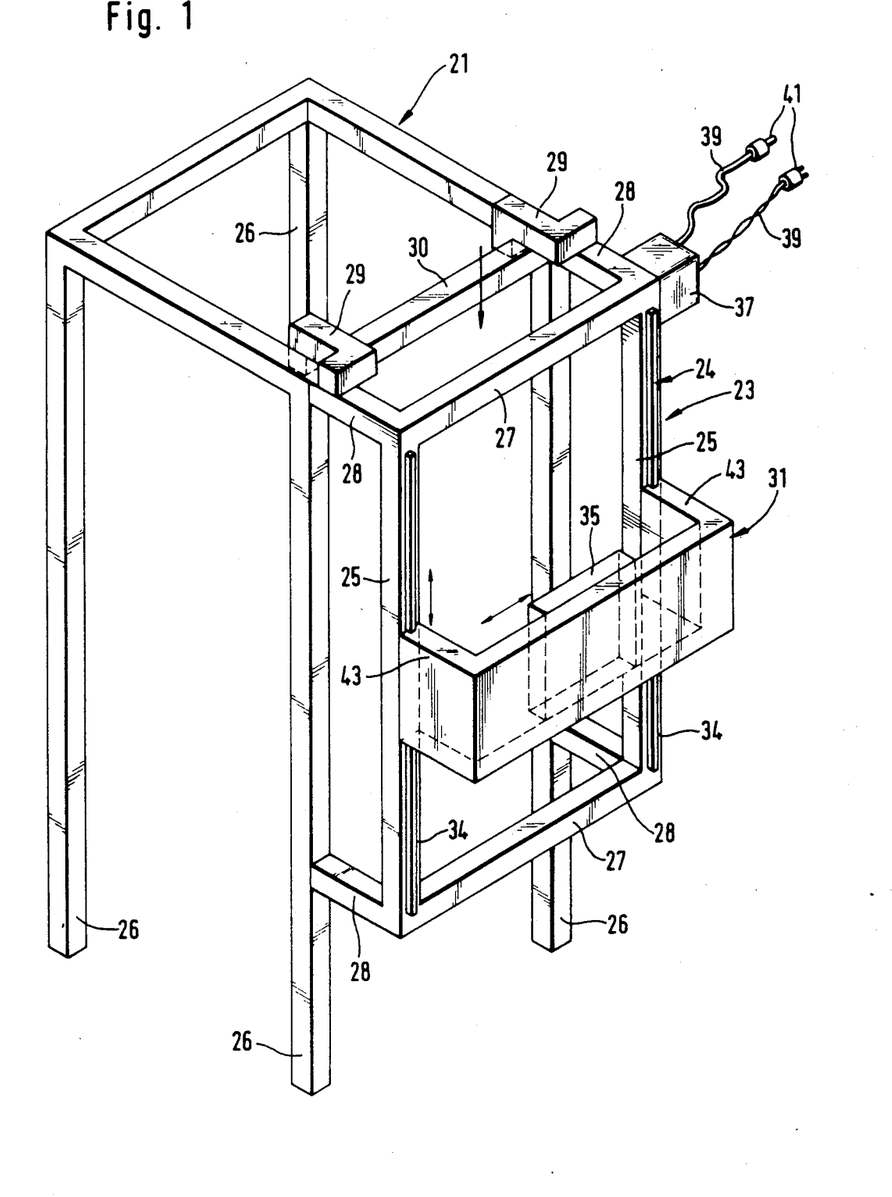
FIG. 1 shows a remotely-operable positioning and carrier arrangement for remote-handling apparatus, which is suspended on the upper front transverse strut of a rack for accommodating process components. In order to clearly show the principle involved, a perspective view has been chosen in which secondary equipment such as drive means, guides or the like have been omitted.

FIG. 1 shows one of a plurality of frame structures, also referred to as racks, which are disposed in a large-area cell and which are arranged along two mutually adjacent walls of the cell. The rack 21 carries, within its outside dimensions, process components and conduits (not shown). A positioning and carrier arrangement 23 for remote-handling apparatus is suspended at the front side of the rack 21.

The positioning and carrier arrangement 23 has a table-like basic frame 24, the two long frame members 25 of which, in the illustrated position, extend parallelly to the four vertical supports or posts 26 of the rack 21. The frame members 25 are connected at their ends by two shorter transverse frame members 27, thereby forming a rectangle. At its four corners, the basic frame 24 has respective legs 28. A long frame member 25, a transverse frame member 27 and a leg 28 respectively form a right-angled corner of a parallelepiped.

In the position shown in FIG. 1, the positioning and carrier arrangement 23 bears with the legs 28 against the two front vertical posts 26 of the rack 21. The legs 28 are horizontal supports or posts of the positioning and carrier arrangement 23. Fixedly mounted to the two upper legs 28 are two hooks 29 which are suspended on the upper front transverse strut 30 of the rack 21.

A U-shaped sled 31 corresponding to the width of the base or main frame 24 is mounted on the main frame 24 so as to be vertically displaceable therealong. For this purpose, the vertically extending frame members 25 of the main frame 24 are provided with slide tracks 34 and mountings for the drive of the sled 31. The sled 31 is guided on the slide tracks 34 of the long frame members 25. An equipment sled 35 is disposed in the sled 31 and is movable in a direction transverse to the direction of movement of the sled 31. The horizontally movable equipment sled 35 is provided with clamping means for mounting the particular remote-handling apparatus in position.

Disposed on the main frame 24 at the outer side of the top right corner, a connection box 37 is provided which represents the supply location for the electrical power supply, information exchange and other supply lines. Hose and cable connections 39 go from the supply box 37 and each terminates in a respective plug coupling 41.

Figure 2:
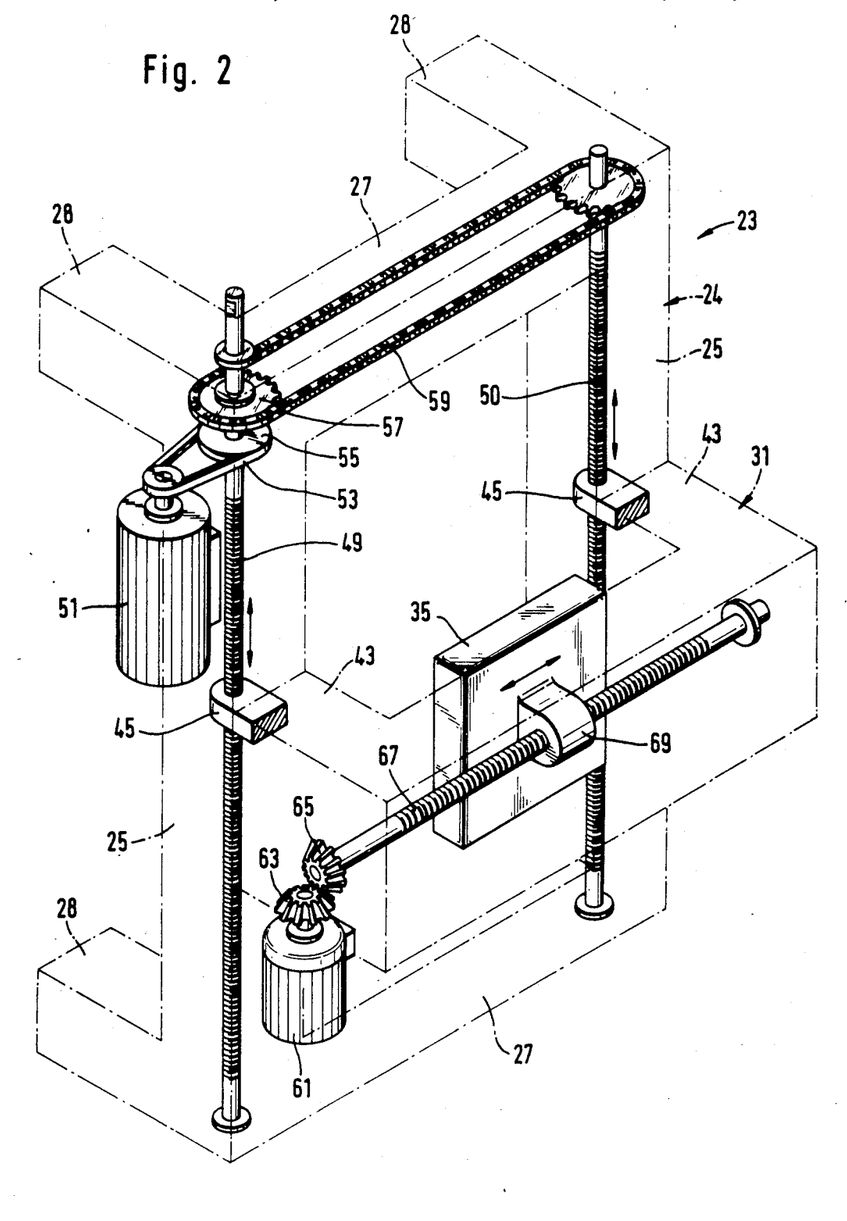
FIG. 2 is a schematic transparent view of the basic frame of the positioning and carrier arrangement shown in FIG. 1 with the two movable sleds and the corresponding drives thereof.

FIG. 2 illustrates the drives for the two movable sleds 31 and 35. At the ends of its two legs 43, the vertically movable sled 31 has respective extensions 45. Each of the extensions is fixedly mounted to its leg and has a threaded bore formed therein. Threaded spindles 49 and 50 pass through corresponding ones of the extensions 45. The spindles 49 and 50 are rotatably mounted in the long frame members 25 of the main frame 24 and are secured against displacement in their respective longitudinal directions.

A motor 51 is fixed to the main frame 24 and is connected by way of a V-belt 53 to a V-belt pulley 55 which is fixedly mounted on threaded spindle 49. The second threaded spindle 50 is positively entrained by the first by means of a gear 57 and a pretensioned link chain 59.

The drive for the horizontally movable equipment sled 35 includes an electric motor 61 which is fixedly mounted on the sled 31. The motor 61 includes an output pinion 63 which meshes with a drive pinion 65 on a horizontally mounted threaded spindle 67. The threaded spindle 67 is rotatably mounted in the sled 31. The threaded spindle 67 engages the sled 35 via a threaded nut 69 mounted thereon.

Figure 3:
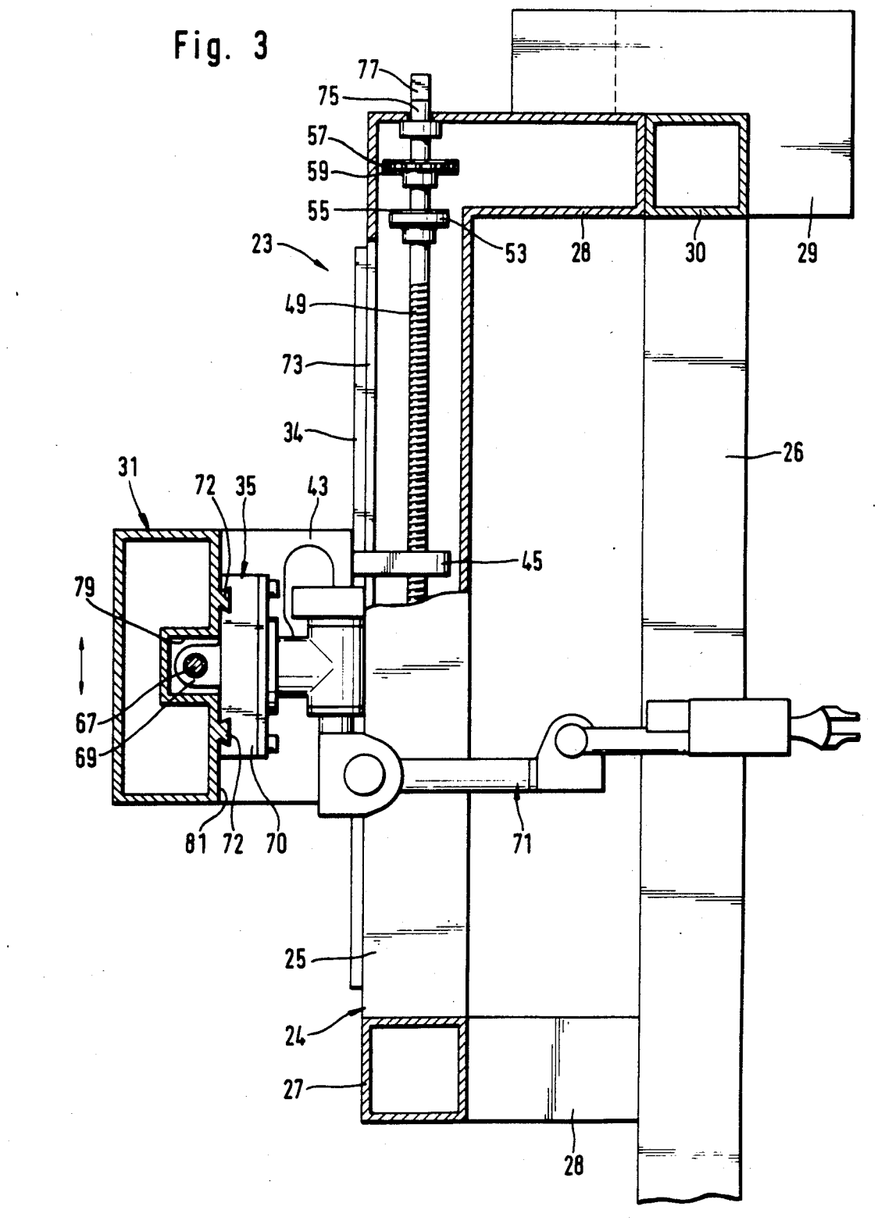
FIG. 3 is a broken-out side view of the positioning and carrier arrangement shown in FIGS. 1 and 2.

FIG. 3 shows the remote-handling apparatus which is fixed on a clamping plate 70 of the equipment sled 35, for example, in the form of a power manipulator 71. The equipment sled 35 is movably mounted on dovetail-shaped guide track 72 of the vertically movable carriage 31.

The threaded extensions 45 of the sled 31 engage through corresponding slots 73 on the front of the long frame members 25 which carry the slide tracks 34. The one threaded spindle 49 has a rotary lug 75 which projects above the upper transverse frame member 27 and which has wrench facets 77 formed thereon which can be engaged by the socket of an impact wrench.

The threaded nut 69 of the equipment sled 35 projects into a horizontally extending recess 79 formed in the inside surface 81 of the sled 31. The horizontal threaded spindle 67 is disposed in the recess 79.

The mode of operation of the above-described arrangement follows below.

The positioning and carrier arrangement 23 is picked up by the bridge crane which is present in the large-area cell and moved into position in front of the particular rack 21 at which work is to be performed. The arrangement 23 is suspended by the hooks 29 on the uppermost front transverse strut 30 of the rack 21. The four legs 28 of the positioning and carrier arrangement 23 press horizontally against the two front vertical posts 26 of the rack 21. The supply cables 39 of the positioning and carrier arrangement 23 are fitted to the plug sockets provided on the wall of the cell by using the lifting tools on the bridge crane. In this way the positioning and carrier arrangement 23 can be operated from a control position outside of the hot cell. The rack 21 and the positioning and carrier arrangement 23 represent an independent processing island.

In accordance with the established coordinates of the work location at which work is required in the rack 21, the two sleds 31 and 35, which are movable relative to each other, are now moved into the operating position under remote control. The remote-handling apparatus, in this case a power manipulator 71, was already placed in position on the supporting plate 70 of the equipment sled 35 prior to transporting the positioning and carrier arrangement 23 to the work location. The plate 70 is the actual base of the remote handling apparatus 71. The maintenance operations can now be carried out by means of the remote handling apparatus 71. Such operations may involve, for example, threadably disengaging a piece of equipment.

The positioning and carrier arrangement 123 shown in FIGS. 4 to 8 is suspended by its upper hooks 129 on a front transverse strut 130 of a rack 121. The table-like main frame 124 of the positioning and carrier arrangement 123 has legs 128 which bear against the rack 121. The table-like main frame 124 has intermediate frame members 83 which extend parallel to longitudinal frame members 125. The frame members 83 are supported by means of struts 85 on the longitudinal frame members 125 to provide increased stiffness.

Figure 4:
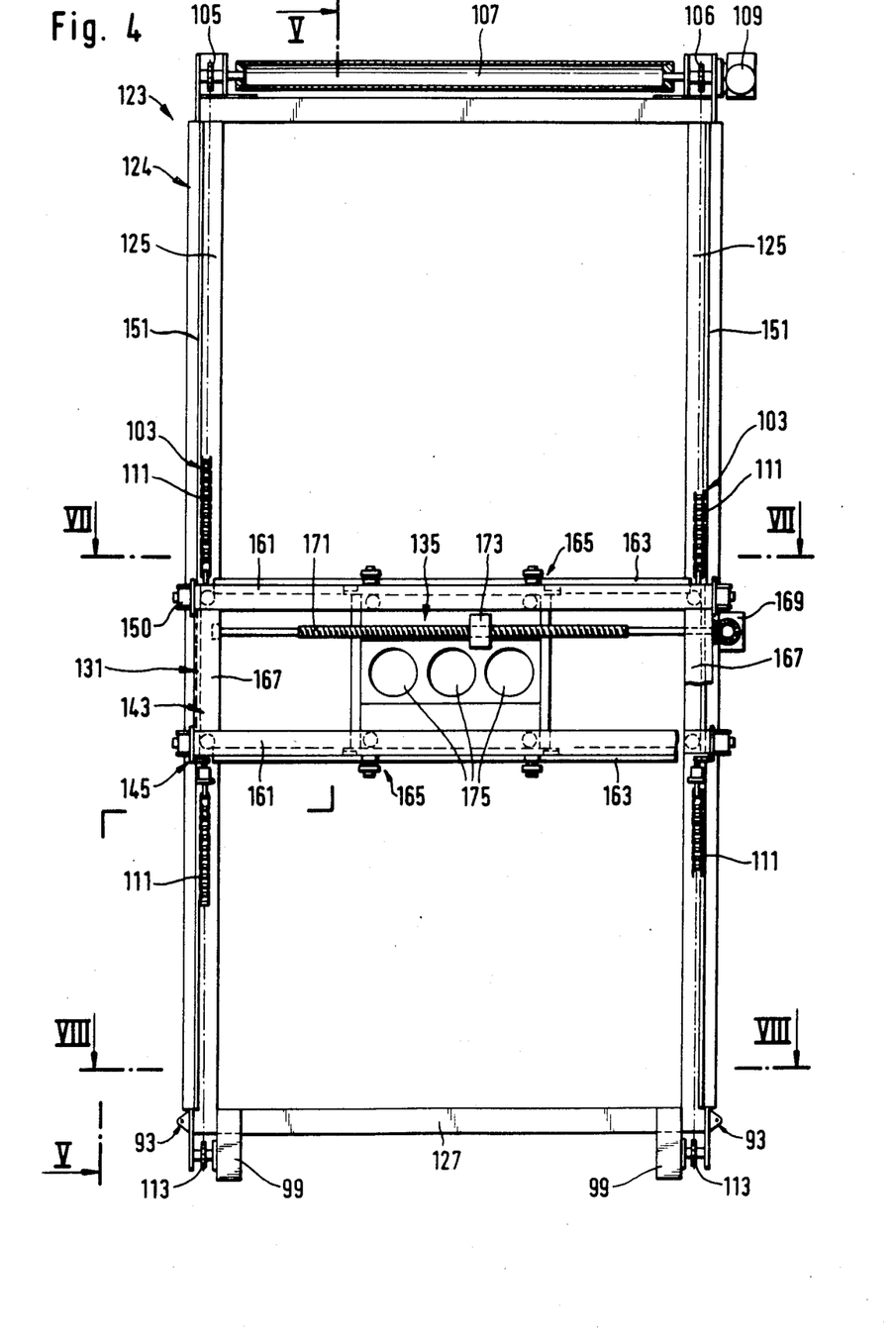
FIG. 4 shows a modified embodiment of a positioning and carrier arrangement of the invention which is hung on a transverse strut of a rack.
Figure 5:
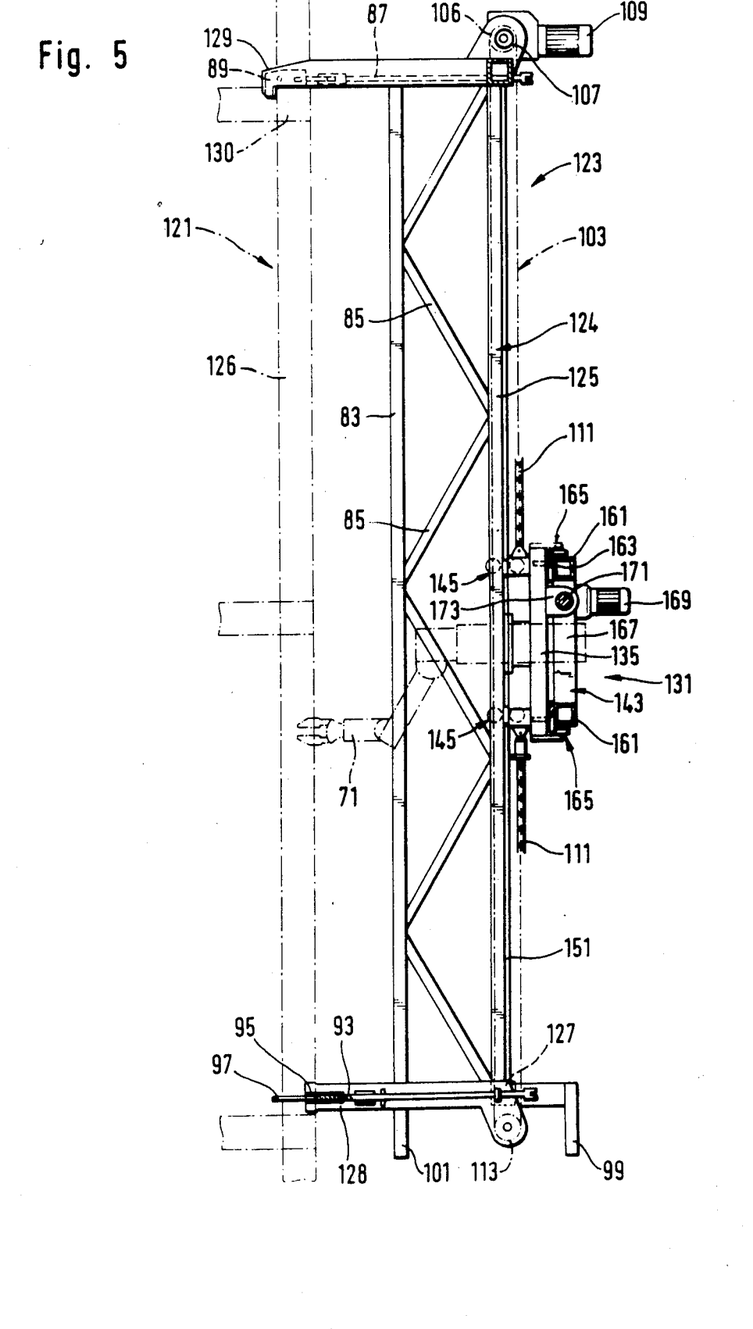
FIG. 5 is a side elevation view of the positioning and carrier arrangement of FIG. 4 taken along line V—V of FIG. 4.
Figure 6:
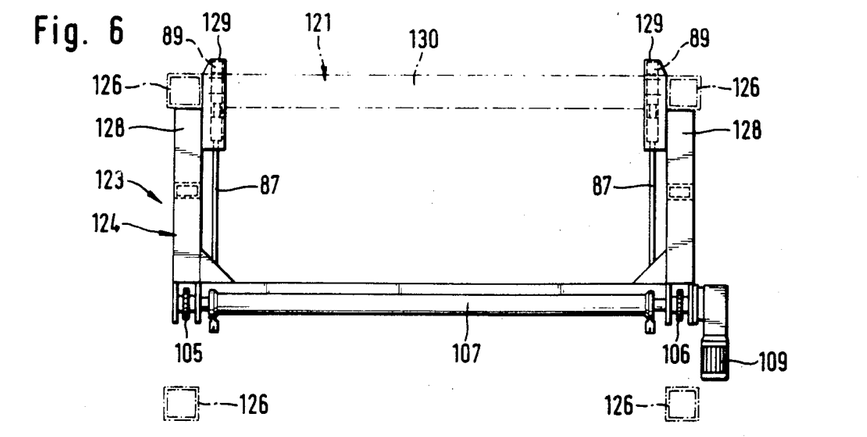
FIG. 6 is a plan view of the positioning and carrier arrangement of FIG. 4.

Latching projections 89 are provided on the two upper hooks 129 which are each displaceable by means of a spindle drive 87. The latching projections 89 grippingly engage a clamping surface behind the transverse strut 130.

Figure 8:
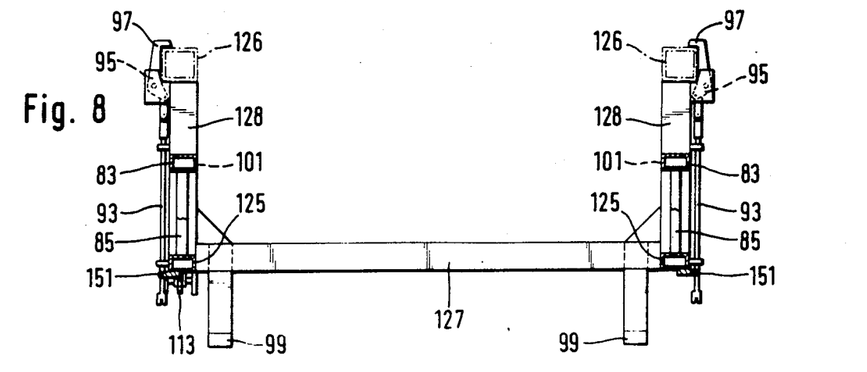
FIG. 8 is a view of the positioning and carrier arrangement of the invention taken along line VIII—VIII of FIG. 4.

Clamps 97 are mounted on the two lower legs 128 on the outside thereof as shown in FIG. 8. The clamps 97 are actuable by means of respective spindle drives 93 and respective lever mechanisms 85. The clamps 97 laterally engage around the sides of the front vertical posts 126 of the rack 121.

On the lower transverse frame member 127, the table-like main frame 124 has two support feet 99 which, with two further support feet 101 on the lower legs 128 make it possible for the positioning and carrier arrangement 123 to be set down while it is not in use.

A vertically movable carriage 131 is mounted on the table-like main frame 124. The vertically movable sled 131 substantially includes a rectangular base frame 143.

The sled 131 is moved vertically by means of a chain drive 103. Disposed on the main frame 124 at the top thereof and at each end thereof are respective gears 105 and 106 which are carried on a rotatably mounted connecting shaft 107. The one gear 106 is driven by a flange-mounted electric motor 109. Each of the two chains 111 is attached at its two ends to the vertically movable sled 131. A direction-changing gear 113 for each chain drive 103 is provided at the lower end of the table-like main frame 124.

Figure 7:
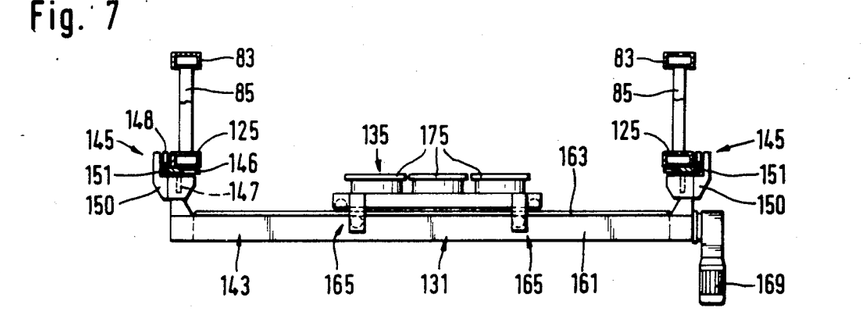
FIG. 7 is a plan view taken along line VII—VII of FIG. 4.

The sled 131 has a three-roller guide arrangement 145 at all four corners thereof. The three rollers 146, 147 and 148 of each roller guide arrangement 145 are rotatably mounted in an angle piece 150 and are disposed in spaced relationship to each other. A guide rail 151 is attached on the front surface of each vertically extending longitudinal frame member 125. Each guide rail 151 has three running surfaces which are in displaced relationship to each other. The three guide rollers 146, 147 and 148 bear against corresponding ones of the above-mentioned running surfaces and thus ensure that the vertically movable sled 131 is properly held in position.

On their inside surfaces, the transversely mounted longitudinal carrier members 161 have respective horizontally extending guide rails 163 which are mutually parallel. A horizontally movable equipment sled 135 which is substantially rectangular runs on the guide rails 163 and also has a three-roller guide arrangement 165 at each of its four corners. Each roller of a guide arrangement runs on a guide surface of the guide rail 163.

One roller runs on the front side of the guide rail and another roller runs on the rear side of the guide rail. In addition to these two rollers, each roller guide arrangement has a third roller which runs on the guide rail 163 on the inward side and is displaced by 90° from the other rollers.

An electric motor 169 is flange-mounted on one of the two vertically extending transverse carrier members 167 of the vertically movable sled 131. The electric motor 169 rotates a threaded spindle 171 by means of a transmission arrangement. The threaded spindle 171 extends parallel to the longitudinal carrier members 161 over the width of the sled 131 and passes through a locking nut 173 which is secured to the equipment sled 135. When the threaded spindle 171 is rotated, the equipment sled 135 is thereby positively displaced in a horizontal direction.

The equipment sled 135 has three round manipulator mountings 175. The handling apparatus can be inserted into and fixed in the mountings 175.

The vertically movable sled 131 is moved to its operating height by means of the chain drive 103. The equipment sled 135 is positioned precisely to the work location, in a horizontal direction, by actuation of the electric motor 169 and the rotary movement of the threaded spindle 171.

It is understood that the foregoing description is that of the preferred embodiments of the invention and that various changes and modifications may be made thereto without departing from the spirit and scope of the invention as defined in the appended claims.

What is claimed is:

1. A remotely-operable positioning and carrier arrangement for receiving and positioning remote-handling apparatus for use in large-area cells such as radioactively-charged large-area cells of a facility for reprocessing irradiated nuclear fuel, the large-area cells containing stationary racks for accommodating process components on which maintenance and service work is to be performed, the racks having an open front end face through which the components are accessible from outside of the rack, the remotely-operable positioning and carrier arrangement comprising:

a table-like base frame adapted so as to make the carrier arrangement transportable;
attachment means formed on said frame for removably suspending said carrier arrangement on the particular rack in which work is to be performed so as to place said base frame in a vertical plane and ahead of said front end face;
said base frame defining an enclosed working field directly forward of said front end face of said stationary rack;
said base frame including legs formed thereon for bracing said carrier arrangement against the rack when said carrier arrangement is mounted thereon;
a first carriage movably mounted on said base frame for movement in the vertical direction across said working field and parallel to said frame, said first carriage having a side facing toward the rack;
a second carriage mounted in said first carriage for movement thereon in a direction transverse to said vertical direction; and,
operating means mounted on said second carriage and extendable through said front end face for operating on said process components.

2. The remotely-operable positioning and carrier arrangement of claim 1, said first carriage being a first sled slideably mounted on said base frame, and said second carriage being a second sled slideably mounted on said first sled; said frame having a quadrilateral shaped and said legs being four in number, two of the legs being upper legs and the other two legs being lower legs, said attachment means comprising two hooks mounted on corresponding ones of said upper legs for engaging said rack so as to permit said base frame to be suspended on said rack.

3. A remotely-operable positioning and carrier arrangement for receiving and positioning remote-handling apparatus for use in large-area cells such as radioactively-charged large-area cells of a facility for reprocessing irradiated nuclear fuel, the large-area cells containing racks for accommodating process components on which maintenance and service work is to be performed, the remotely-operable positioning and carrier arrangement comprising:

a table-like base frame adapted so as to make the carrier arrangement transportable;
attachment means formed on said frame for removably attaching said carrier arrangement to the particular rack in which work is to be performed;
said base frame including legs formed thereon for bracing said carrier arrangement against the rack when said carrier arrangement is mounted thereon;
a first carriage movably mounted on said base frame for movement in the vertical direction parallel to said frame, said first carriage having a side facing toward the rack; and,
a second carriage mounted in said first carriage for movement thereon in a direction transverse to said vertical direction;
said first carriage being a first sled slideably mounted on said base frame, and said second carriage being a second sled slideably mounted on said first sled;
said frame having a quadrilateral shape and said legs being four in number, two of the legs being upper legs and the other two legs being lower legs; and,
said attachment means including two hooks mounted on corresponding ones of said upper legs for engaging said rack so as to permit said base frame to be suspended on said rack; and, mechanically-actuated clamps mounted on corresponding ones of said lower legs.

4. The remotely-operable positioning and carrier arrangement of claim 3, wherein the rack has a transverse beam for engagement by said hooks, said hooks being configured to engage said transverse beam on the rearward side thereof facing away from said base frame.

5. The remotely-operable positioning and carrier arrangement of claim 1, comprising coupling means for connecting electrical and information supply lines into said carrier arrangement.

6. A remotely-operably positioning and carrier arrangement for receiving and positioning remote-handling apparatus for use in large-area cells such as radioactively-charged large-area cells of a facility for reprocessing irradiated nuclear fuel, the large-area cells containing racks for accommodating process components on which maintenance and service work is to be performed, the remotely-operable positioning and carrier arrangement comprising:

a table-like base frame adapted so as to make the carrrier arrangement transportable;

attachment means formed on said frame for removably attaching said carrier arrangement to the particular rack in which work is to be performed;

said base frame including legs formed thereon for bracing said carrier arrangement against the rack when said carrier arrangement is mounted thereon;

a first carriage movably mounted on said base frame for movement in the vertical direction parallel to said frame, said first carriage having a side facing toward the rack; and, a second carriage mounted in said first carriage for movement thereon in a direction transverse to said vertical direction;

said first carriage being a first sled slideably mounted on said base frame, and said second carriage being a second sled slideably mounted on said first sled;

said frame having a quadrilateral shape and said legs being four in number, two of the legs being upper legs and the other two legs being lower legs;

said attachment means including two hooks mounted on corresponding ones of said upper legs for engaging said rack so as to permit said base frame to be suspended on said rack; and, said base frame including vertically extending supporting struts for slideably accommodating said first sled thereon for movement in a vertical direction; and, roller guide means for holding said first sled in its position on said supporting struts during its movement therealong; and, chain drive means for driving said first sled up and down said supporting struts.

7. The remotely-operable positioning and carrier arrangement of claim 6, said first sled having beam-like members extending transversely to said supporting struts, said second sled being slideably mounted on said beam-like members for movement therealong; and, ancillary roller guide means for holding said second sled in its position on said beam-like members during its movement therealong.

8. The remotely-operable positioning and carrier arrangement of claim 7, said second sled having a rectangular configuration.

9. The remotely-operable positioning and carrier arrangement of claim 7, comprising drive means for driving said second sled along said beam-like members, said drive means comprising a threaded spindle rotatably mounted on said first sled so as to extend in a direction parallel to said beam-like members; threaded bore means formed on said second sled for threadably engaging said threaded spindle; and, drive means for rotatably driving said threaded spindle thereby causing said second sled to move along said beam-like members.

10. A remotely-operable positioning and carrier arrangement for receiving and positioning remote-handling apparatus for use in large-area cells such as radioactively-charged large-area cells of a facility for reprocessing irradiated nuclear fuel, the large-area cells containing racks for accommodating process components on which maintenance and service work is to be performed, the remotely-operable positioning and carrier arrangement comprising:

a table-like base frame adapted so as to make the carrier arrangement transportable;

attachment means formed on said frame for removably attaching said carrier arrangement to the particular rack in which work is to be performed;

said base frame including legs formed thereon for bracing said carrier arrangement against the rack when said carrier arrangement is mounted thereon;

a first carriage movably mounted on said base frame for movement in the vertical direction parallel to said frame, said first carriage having a side facing toward the rack; and, a second carriage mounted in said first carriage for movement thereon in a direction transverse to said vertical direction;

said first carriage being a first sled slideably mounted on said base frame, and said second carriage being a second sled slideably mounted on said first sled;

said frame having a quadrilateral shape and said legs being four in number, two of the legs being upper legs and the other two legs being lower legs;

said attachment means including two hooks mounted on corresponding ones of said upper legs for engaging said rack so as to permit said base frame to be suspended on said rack, and, supporting feet pairs disposed on corresponding ones of said lower legs for permitting said carrier arrangement to stand on a level surface while said carrier arrangement is not in use.

11. The remotely-operable positioning and carrier arrangement of claim 10, said feet pairs extending at right angles from said lower legs, respectively.

12. The remotely-operable positioning and carrier arrangement of claim 6, said second sled having a tubularly-shaped receptacle for receiving said remote-handling apparatus therein.

* * * * *